(12) United States Patent
Okabe et al.

(10) Patent No.: US 11,292,219 B2
(45) Date of Patent: Apr. 5, 2022

(54) METHOD OF SHAPING COMPOSITE BLADE

(71) Applicant: MITSUBISHI HEAVY INDUSTRIES, LTD., Tokyo (JP)

(72) Inventors: Ryoji Okabe, Tokyo (JP); Kentaro Shindo, Tokyo (JP); Masami Kamiya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 220 days.

(21) Appl. No.: 16/781,279

(22) Filed: Feb. 4, 2020

(65) Prior Publication Data

US 2020/0298521 A1    Sep. 24, 2020

(30) Foreign Application Priority Data

Mar. 18, 2019  (JP) .............................. JP2019-050506

(51) Int. Cl.
*B29D 99/00*    (2010.01)
*F01D 5/14*     (2006.01)
(Continued)

(52) U.S. Cl.
CPC ........ *B29D 99/0025* (2013.01); *B29C 70/345* (2013.01); *F01D 5/147* (2013.01);
(Continued)

(58) Field of Classification Search
CPC .............. B29D 99/0025; B29C 70/345; B29C 35/0288; F01D 5/147; F01D 5/282; B29L 2031/08
See application file for complete search history.

(56) References Cited

U.S. PATENT DOCUMENTS

| 5,042,968 A | 8/1991 | Fecto |
| 5,096,384 A | 3/1992 | Immell et al. |

(Continued)

FOREIGN PATENT DOCUMENTS

| CN | 101842230 | 9/2010 |
| CN | 102161782 | 8/2011 |

(Continued)

OTHER PUBLICATIONS

Office Action dated Jan. 4, 2021 in corresponding German Patent Application No. 10 2020 001 022.9 with English-language translation.

(Continued)

*Primary Examiner* — Michael L Sehn
(74) *Attorney, Agent, or Firm* — Wenderoth, Lind & Ponack, L.L.P.

(57) ABSTRACT

Provided is a method of shaping a composite blade made of a composite material by curing prepreg in which reinforcing fibers are impregnated with resin. A foaming agent disposed in an internal space of the composite blade contains a plurality of foaming bodies and foaming agent resin. The foaming bodies foam by being heated. The foaming agent resin cures by being heated. The foaming bodies include low-temperature side foaming bodies and high-temperature side foaming bodies. The low-temperature side foaming bodies foam in a low temperature range during a curing step. The high-temperature side foaming bodies foam in a high temperature range corresponding to temperatures higher than the low temperature range during the curing step.

4 Claims, 7 Drawing Sheets

(51) Int. Cl.
  *B29C 70/34* (2006.01)
  *B29C 35/02* (2006.01)
  *F01D 5/28* (2006.01)
  *B29L 31/08* (2006.01)
  *B29C 70/86* (2006.01)

(52) U.S. Cl.
  CPC ........ *B29C 35/0288* (2013.01); *B29C 70/865* (2013.01); *B29L 2031/08* (2013.01); *F01D 5/282* (2013.01)

(56) References Cited

U.S. PATENT DOCUMENTS

| | | | |
|---|---|---|---|
| 5,403,153 | A | 4/1995 | Goetze |
| 5,720,597 | A | 2/1998 | Wang et al. |
| 7,980,840 | B2 * | 7/2011 | Burchardt ............. B29C 70/548 425/129.1 |
| 8,075,277 | B2 * | 12/2011 | Stiesdal ................ B29C 70/547 416/230 |
| 8,465,832 | B2 | 6/2013 | Jones |
| 2010/0261000 | A1 | 10/2010 | Jones |
| 2014/0147620 | A1 | 5/2014 | Li et al. |
| 2016/0032519 | A1 | 2/2016 | Li et al. |
| 2017/0087777 | A1 | 3/2017 | Gans et al. |

FOREIGN PATENT DOCUMENTS

| | | |
|---|---|---|
| CN | 102767471 | 11/2012 |
| CN | 104690985 | 6/2015 |
| CN | 104955996 | 9/2015 |
| CN | 105648836 | 6/2016 |
| CN | 108705829 | 10/2018 |
| DE | 3805100 | 8/1989 |
| EP | 0541718 | 5/1993 |
| EP | 0754539 | 1/1997 |
| EP | 1 811 129 | 7/2007 |
| FR | 2653743 | 10/1990 |
| JP | 9-303104 | 11/1997 |
| JP | 09-303104 | 11/1997 |
| TW | 200900226 | 1/2009 |
| TW | 201338961 | 10/2013 |
| WO | 92/02410 | 2/1992 |
| WO | 2017/162277 | 9/2017 |

OTHER PUBLICATIONS

Office Action dated Aug. 17, 2021 in corresponding Chinese Patent Application No. 202010090786.6, with English translation.

* cited by examiner

METHOD OF SHAPING COMPOSITE BLADE

CROSS-REFERENCE TO RELATED APPLICATIONS

The present application claims priority to and incorporates by reference the entire contents of Japanese Patent Application No. 2019-050506 filed in Japan on Mar. 18, 2019.

FIELD

The present invention relates to a method of shaping a composite blade.

BACKGROUND

Conventionally, a gas turbine blade having an airfoil part extending from a blade tip toward a blade root has been known as a composite blade (for example, see Patent Literature 1). The airfoil part includes a metal part and a foam part. The metal part has a surface recess formed thereon. The surface recess of the metal part has the foam part provided therein. The metal part and the foam part are enclosed by a composite skin and bonded to the composite skin. The airfoil part is further provided with an anti-erosion coating that covers the composite skin.

CITATION LIST

Patent Literature

Patent Literature 1: Japanese Patent Application Laid-Open No. H09-303104

SUMMARY

Technical Problem

A composite blade needs to be shaped with highly precise dimensional accuracy for the shape of the blade, particularly, the surface shape of the blade. In the composite blade disclosed in Patent Literature 1, the composite skin has the metal part to the inside thereof. Therefore, when the metal part and the composite skin are integrally shaped, possible processes include placing a mold to the outside of the composite skin at the same time as placing the metal part to the inside of the composite skin. Instead, when the metal part and the composite skin are separately shaped, possible processes include forming the composite skin with high precision and then forming the metal part with high precision so that the shape of the metal part can correspond to the shape of a space inside of the composite skin.

However, when the metal part and the composite skin are integrally shaped, forming the surface shape of the composite skin with high precision is sometimes difficult because pressure cannot be applied to the composite skin from the inside toward the outside. When the composite skin is shaped without pressure applied to the composite skin, it is difficult to prevent void generation caused inside of the composite skin. Otherwise, when the metal part and the composite skin are separately shaped, the metal part needs to be formed with high precision, and the cost for forming the metal part is therefore high, which makes it difficult to reduce the manufacturing cost for the composite blade. In any of the cases, the metal part is provided inside of the composite blade, which makes weight reduction difficult and offsets an advantage brought by a composite blade, that is, a benefit in terms of weight reduction.

For that reason, forming a composite blade using a composite material and without using a metallic material has been under study. When a composite blade is shaped, in order that the surface shape of a composite blade be shaped with high precision, a foaming agent is placed inside of the composite blade and cause to foam during hot forming, whereby pressure is applied to the composite blade from the inside thereof toward the outside thereof.

Herein, when resin having heat resistance is used as resin for use in the composite blade, this resin enters a low viscosity state during hot forming (during a heating process) for curing the resin. In addition, the low viscosity state of the resin continues for a long period of time, and the pressurization on the composite blade therefore needs to be maintained for a long period of time. However, it is difficult to keep the foaming agent foaming for a long time. Pressure application using foams becomes weaker over time. The foaming agent applies insufficient pressing force, and the composite blade can consequently suffer a formation defect. Furthermore, a foaming agent contains foaming agent resin that thermally cures. Thus, when a heating temperature is increased during hot shaping, the foaming agent cures and consequently prohibited from foaming. The resulting composite blade can consequently have a shaping defect.

Given the above inconveniences, the present invention is directed to providing a method of shaping a composite blade that is capable of suitably shaping a composite blade by appropriately pressurizing an internal space of the composite blade using a foaming agent.

Solution to Problem

A method according to one aspect of the present invention is of shaping a composite blade made of a composite material by curing prepreg in which reinforcing fibers are impregnated with resin, the composite blade including a suction-side part and a pressure-side part which are overlapped and bonded to each other. The method includes laying up plies of the prepreg in a suction-side mold for shaping the suction-side part to form a suction-side laminate and laying up plies of the prepreg in a pressure-side mold for shaping the pressure-side part to form a suction-side laminate; performing mold setting between the suction-side mold and the pressure-side mold so that overlaps the suction-side laminate and the pressure-side laminate on each other, and disposing a foaming agent in an internal space formed by having the suction-side laminate and the pressure-side laminate overlapped on each other; and pressurizing the suction-side laminate and the pressure-side laminate from inside toward the suction-side mold and the pressure-side mold, respectively, by heating the foaming agent to expand, and heating the suction-side laminate and the pressure-side laminate to cure. The foaming agent includes a plurality of foaming bodies adapted to foam by being heated and foaming agent resin adapted to cure by being heated. The plurality of foaming bodies include low-temperature side foaming bodies adapted to foam in a low temperature range in the heating the suction-side laminate and the pressure-side laminate to cure, and high-temperature side foaming bodies adapted to foam in a high temperature range corresponding to temperatures higher than the low temperature range in the heating the suction-side laminate and the pressure-side laminate to cure.

With this configuration, the foaming agent can foam in multiple stages in the step of heating the suction-side laminate and the pressure-side laminate to cure. Therefore, pressurization in the internal space of the composite blade can be maintained, and the foaming agent can appropriately pressurize the internal space of the composite blade. Therefore, the composite blade can be prevented from having a shaping defect, so that the composite blade can be suitably shaped. Foam beads each obtained by covering a foaming ingredient with a coat made of thermoplastic resin are used as the foaming bodies, for example.

Preferably, the high-temperature side foaming bodies starts to foam is higher than a temperature at which the resin in the prepreg starts to gel.

With this configuration, the high-temperature side foaming bodies foam after the prepreg reaches the resin gelling starting temperature. Therefore, even when the pressurization is weakened as a result of expansion of the internal space by curing of the prepreg, the insufficiency of pressurization can be avoided because the pressurization in the internal space can be maintained by foaming of the high-temperature side foaming bodies after the resin gelling starting temperature is reached.

Preferably, a temperature at which the low-temperature side foaming bodies starts to foam is lower than a temperature at which the resin in the prepreg starts to gel.

With this configuration, the low-temperature side foaming bodies foam before the prepreg reaches the resin gelling starting temperature. Therefore, separation between the plies of prepreg due to decrease in viscosity of the resin in the prepreg when the prepreg is heated can be prevented by foaming of the low-temperature side foaming bodies.

Preferably, the temperature at which the resin in the prepreg starts to gel is higher than a temperature at which the foaming agent resin in the foaming agent starts to gel, and the temperature at which the low-temperature side foaming bodies starts to foam is lower than the temperature at which the foaming agent resin in the foaming agent starts to gel.

With this configuration, the resin gelling starting temperature is higher than the foaming agent gelling starting temperature, so that the foaming agent resin in the foaming agent cures earlier than the resin in the prepreg. Consequently, the low-temperature side foaming bodies foam before the foaming agent resin reaches the foaming agent gelling starting temperature, whereby the internal space can be filled with the foaming agent by dispersion before the foaming agent cures.

DESCRIPTION OF EMBODIMENTS

The following describes embodiments according to the present invention in detail based on the drawings. These embodiments are not intended to limit this invention. Components in the following embodiments include those replaceable by the skilled person or those substantially identical to each other. Each of the components described below can be used in combination with any of the other components as appropriate and, provided that a plurality of embodiments are available, each of the embodiments can be used in combination with any of the other embodiments.

First Embodiment

A method of shaping a composite blade 10 according to a first embodiment is a method of shaping a blade using a composite material composed of reinforcing fibers and resin. The composite blade 10 is applicable to, for example, a turbine blade or a turbine vane that is used in an apparatus such as a gas turbine or a gas turbine engine. In the first embodiment, the composite blade 10 is described as being applied to a turbine blade. However, the method of shaping the composite blade 10 is applicable also to a turbine vane.

Figure 1:
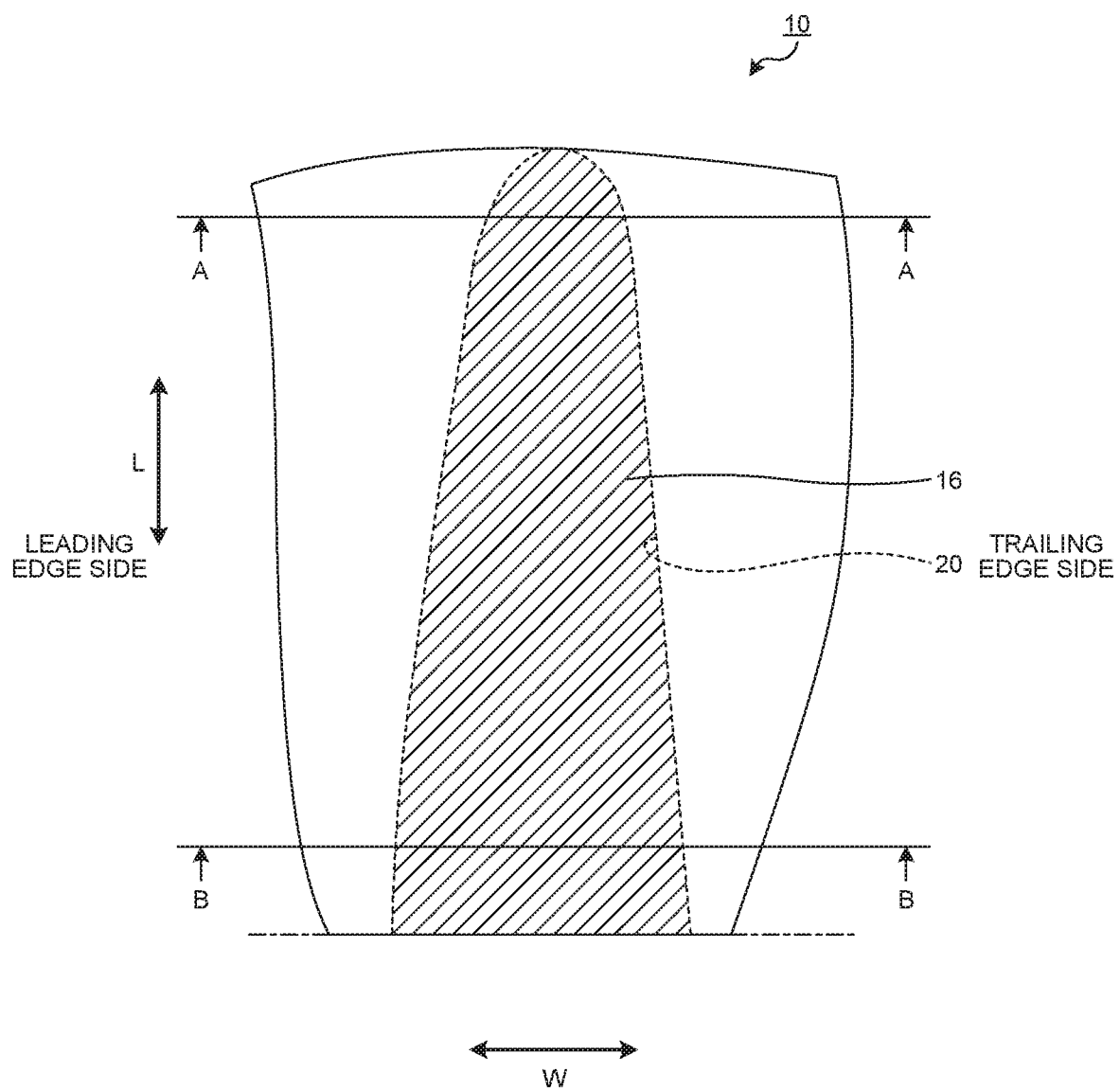
FIG. 1 is a plan view schematically illustrating a composite blade shaped by a method of shaping a composite blade according to a first embodiment.
Figure 2:
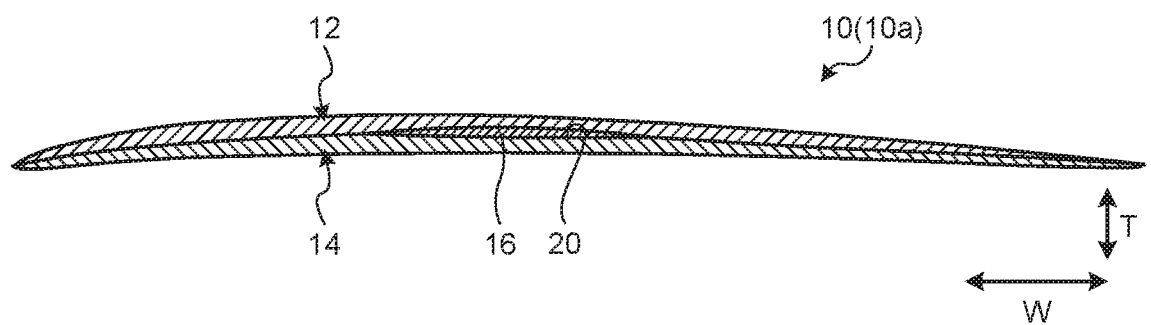
FIG. 2 is a sectional view schematically illustrating a thin part of the composite blade according to the first embodiment.
Figure 3:
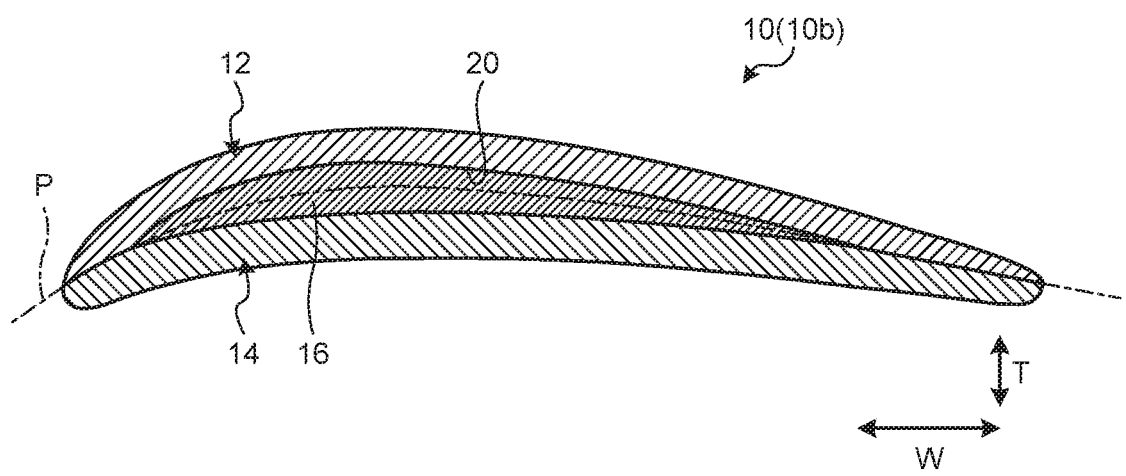
FIG. 3 is a sectional view schematically illustrating a thick part of the composite blade according to the first embodiment.
Figure 4:
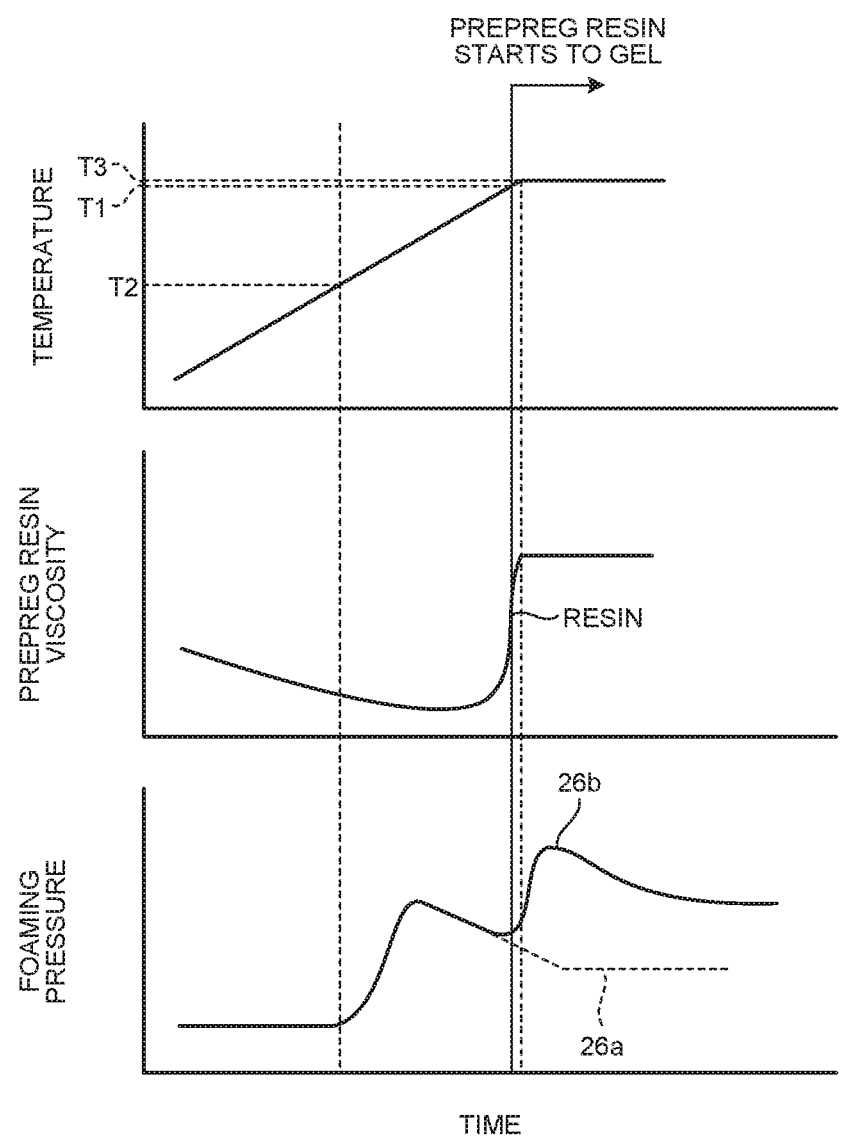
FIG. 4 illustrates graphs regarding a foaming agent for use in the method of shaping a composite blade according to the first embodiment.
Figure 5:
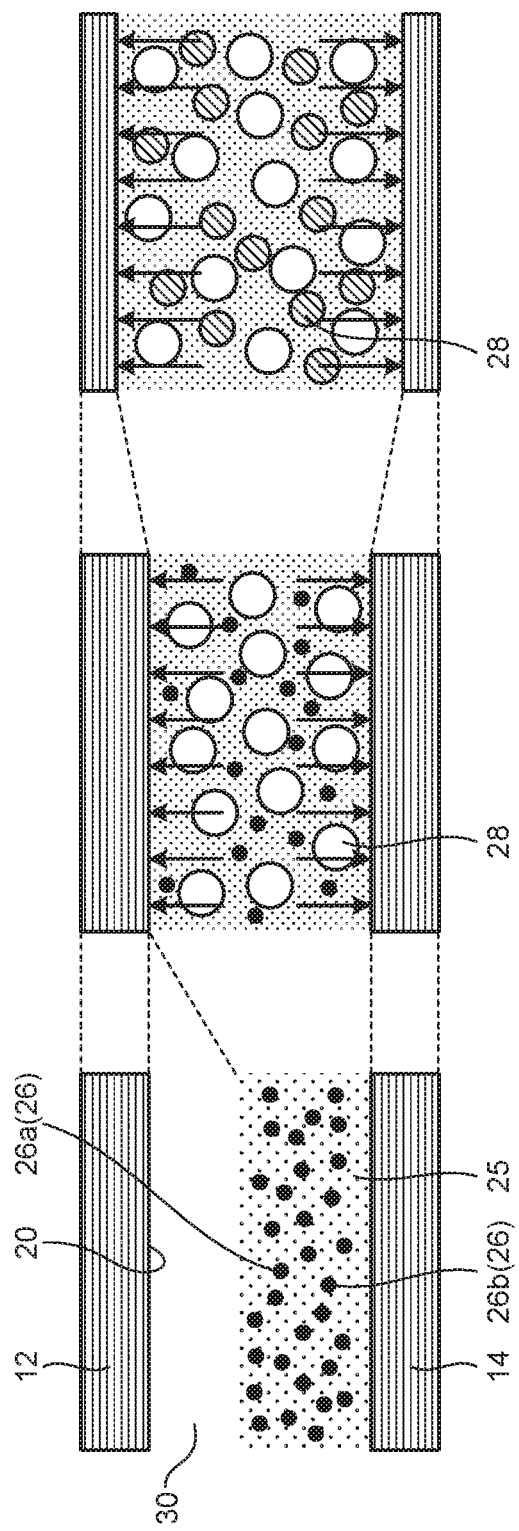
FIG. 5 illustrates states in terms of foaming of the foaming agent for use in the method of shaping a composite blade according to the first embodiment.
Figure 6:
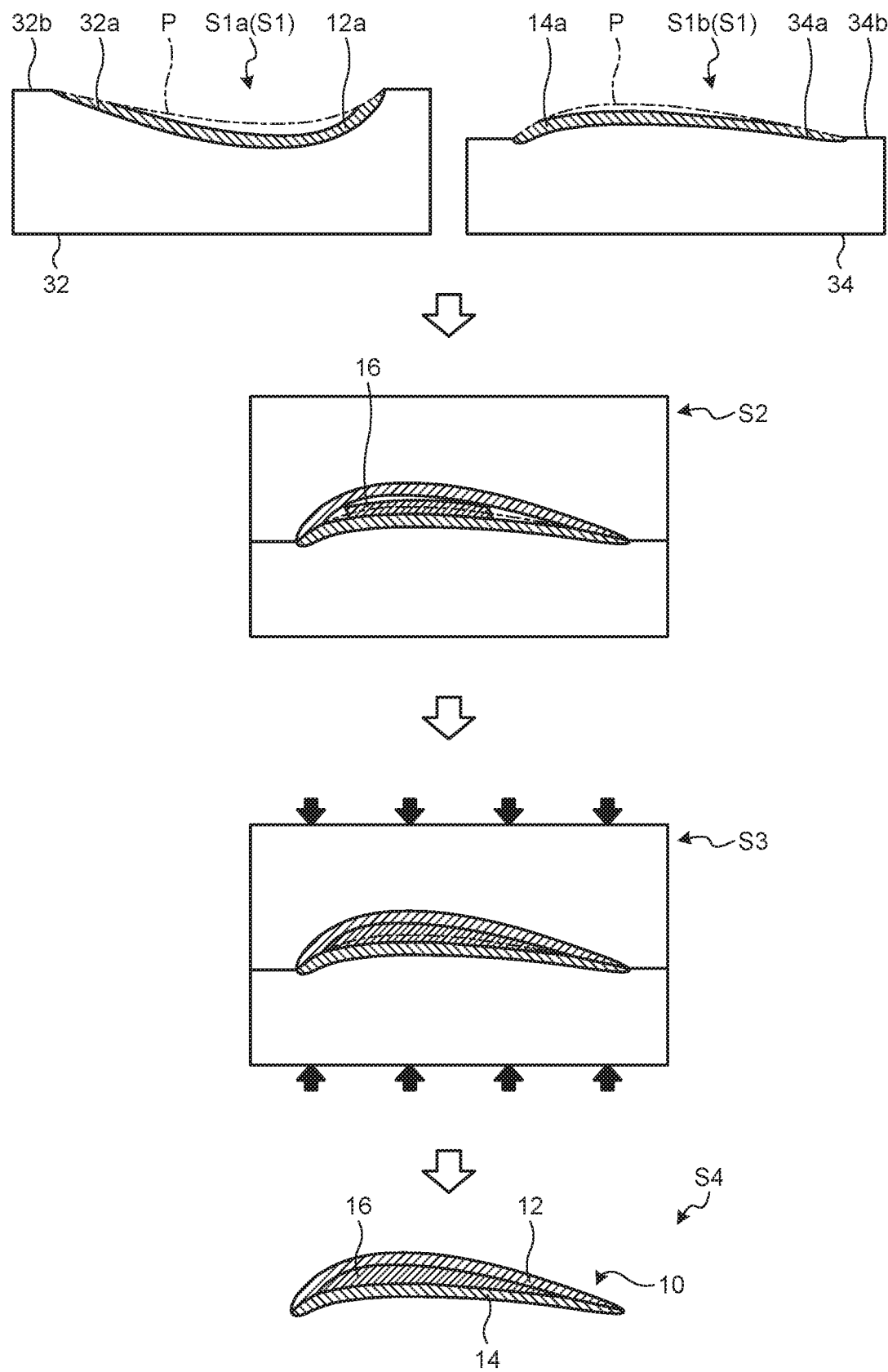
FIG. 6 illustrates the method of shaping a composite blade according to the first embodiment.

FIG. 1 is a plan view schematically illustrating a composite blade shaped by a method of shaping a composite blade according to the first embodiment. FIG. 2 is a sectional view schematically illustrating a thin part of the composite blade according to the first embodiment and is a sectional view taken along A-A line in FIG. 1. FIG. 3 is a sectional view schematically illustrating a thick part of the composite blade according to the first embodiment, and is a sectional view taken along B-B line in FIG. 1. FIG. 4 illustrates graphs regarding a foaming agent for use in the method of shaping a composite blade according to the first embodiment. FIG. 5 illustrates states in terms of foaming of the foaming agent for use in the method of shaping a composite blade according to the first embodiment. FIG. 6 illustrates the method of shaping a composite blade according to the first embodiment.

First, the composite blade 10 is described before the method of shaping the composite blade 10 is described. As illustrated in FIG. 1, the composite blade 10 is a turbine blade and extends from a blade root side formed as a fixed end to a blade tip side formed as a free. Herein, directions connecting between the blade root side and the blade tip side are blade-length directions, which correspond to L directions illustrated in FIG. 1. In directions perpendicular to the blade-length directions in FIG. 1, one side of the composite blade 10 is a leading edge side, and the other side thereof is a trailing edge side. Herein, directions connecting between the leading edge side and the trailing edge side are blade-width directions, which correspond to W directions illustrated in FIG. 1.

As illustrated in FIG. 2 and FIG. 3, the composite blade 10 is formed so as to be curved overall in the blade-width directions. One side of the composite blade 10 is convex toward the outside thereof from the inside thereof and is defined as a suction side. The other side of the composite blade 10 is concave toward the outside thereof from the inside thereof and is defined as a pressure side. Herein, directions connecting between the suction side and the pressure side are blade-thickness directions, which correspond to T directions illustrated in FIG. 2 and FIG. 3.

In terms of thickness in the blade-thickness direction, the composite blade 10 is formed so as to be thicker toward the blade root and thinner toward the blade tip. Therefore, the composite blade 10 has a thin part 10a on one side toward the blade tip, which is relatively thin in the blade-thickness direction, as illustrated in FIG. 2 and has a thick part 10b on the other side toward the blade root, which is relatively thick in the blade-thickness direction, as illustrated in FIG. 3.

A plurality of such composite blades 10 are provided on the outer circumference of a rotor that rotates about the axis thereof, next to one another in the circumferential direction with certain intervals therebetween. Between the adjacent composite blades 10, fluid flows in a direction from the leading edge toward the trailing edge of each of the composite blades 10.

As illustrated in FIG. 2 and FIG. 3, the composite blade 10 includes a suction-side blade member (suction-side part) 12 corresponding to a part at the suction side thereof, a pressure-side blade member (pressure-side part) 14 corresponding to a part at the pressure side thereof, and a foaming agent 16 provided in an internal space 20 formed by the suction-side blade member 12 and the pressure-side blade member 14.

The suction-side blade member 12 is obtained by laying up on one another and thermally curing a plurality of plies of prepreg in which reinforcing fibers are impregnated with resin. The suction-side blade member 12 is shaped using a suction-side mold 32 described down below. In the suction-side blade member 12, the external surface of the composite blade 10 is formed in a convex curved shape. In the suction-side blade member 12, the internal surface of composite blade 10 is formed in a concave curved shape and used as a part of an internal surface that defines the internal space 20.

In the similar manner as the suction-side blade member 12, the pressure-side blade member 14 is obtained by laying up on one another and thermally curing a plurality of plies of prepreg in which reinforcing fibers are impregnated with resin. The pressure-side blade member 14 is shaped using a pressure-side mold 34 described down below. In the pressure-side blade member 14, the external surface of the composite blade 10 is formed in a concave curved shape. In the pressure-side blade member 14, the internal surface of composite blade 10 is a convex curved shape and forms a part of an internal surface that defines the internal space 20.

The two opposite end parts of the suction-side blade member 12 in the blade-width direction and the corresponding two opposite end parts of the pressure-side blade member 14 in the blade-width direction are bonded together through a neutral plane P that includes the center of the composite blade 10 in the blade-thickness direction. An internal surface of the suction-side blade member 12 between the two opposite end parts thereof in the blade-width direction and an internal surface of the pressure-side blade member 14 between the two opposite ends in the blade-width direction are formed so as to be apart toward the external surface with respect to the neutral plane P, and those internal surfaces form the internal space 20. This internal space 20 is larger toward the blade root of the composite blade 10 and smaller toward the blade tip of the composite blade 10.

In the first embodiment, the resin contained in the prepreg has heat resistance after being thermally cured. Specifically, the resin contained in the prepreg is resin that starts to cure at a temperature of about 170° C. and that thermally cures with the temperature maintained at 180° C.

While the prepreg containing the reinforcing fibers and the resin is used in the first embodiment, applicable examples of the reinforcing fibers include, but not limited to carbon fibers, glass fibers, and aramid fibers, and further include plastic fibers and metallic fibers. The resin is preferably thermosetting resin but may be thermoplastic resin. Examples of the thermosetting resin includes an epoxy resin, a polyester resin, and a vinyl ester resin. Examples of the thermoplastic resin include a polyamide resin, a polypropylene resin, an acrylonitrile butadiene styrene (ABS) resin, polyetheretherketone (PEEK), polyetherketoneketone (PEKK), and polyphenylenesulfide (PPS). However, the resin with which the reinforcing fibers are impregnated is not limited to these examples and may be another resin.

The internal space 20 is filled with the foaming agent 16. This foaming agent 16 is placed in the internal space 20 and then heated to foam, whereby the internal space 20 is filled therewith. As illustrated in FIG. 5, before foaming, the foaming agent 16 is formed of foaming agent resin 25 and a plurality of foaming bodies 26. The foaming agent resin 25 cures by being heated and may be the same resin as the one contained in the prepreg.

The foaming bodies 26 foam by being heated, and, for example, the foaming bodies 26 turn into carbon dioxide or the like, which results in generation air bubbles 28 in the foaming agent resin 25. The foaming bodies 26 have different foaming temperatures at which the foaming bodies 26 foam by being heated. That is, the foaming bodies 26 include low-temperature side foaming bodies 26a and high-temperature side foaming bodies 26b. The low-temperature side foaming bodies 26a foam in a low temperature range corresponding to low heating temperatures during the thermal curing. The high-temperature side foaming bodies 26b foam in a high temperature range corresponding to temperatures higher than the low temperature range during the thermal curing. Foam beads, for example, are used as the foaming bodies 26, which are each obtained by covering a foaming ingredient with a coat made of thermoplastic resin.

For the low-temperature side foaming bodies 26a, examples of the resin used as the coat with which the foaming ingredient is covered include polyethylene and an ABS resin. For the high-temperature side foaming bodies 26b, examples of the resin used as the coat with which the foaming ingredient is covered include polyacetal, nylon 6, polyvinylidene chloride, and polysulfon. Thus, the foaming bodies 26 have different foaming temperatures by using different kinds of resin as coats with which the foaming ingredient is covered.

For the foaming bodies 26 to generate a uniform and stable foaming state, a fiber ingredient may be added to the foaming agent 16.

Next, with reference to FIG. 4, foaming of the foaming agent 16 is described. A graph illustrated in the upper part of FIG. 4 represents change in temperature of the resin in the prepreg during thermal curing (curing step S3 described below) with the horizontal axis indicating time and the vertical axis indicating the temperature. Another graph illustrated in the central part of FIG. 4 represents change in viscosity of the resin in the prepreg during the thermal curing with the horizontal axis indicating time and the vertical axis indicating the viscosity. Still another graph illustrated in the lower part of FIG. 4 represents change in foaming pressure, which is pressuring force of the foaming agent 16 during the thermal curing with the horizontal axis indicating time and the vertical axis indicating the foaming pressure.

As illustrated in FIG. 4, a temperature at which the resin contained in the prepreg starts to gel is set as a prepreg gelling starting temperature (resin gelling starting temperature) T1 (hereinafter referred to simply as temperature T1). During the thermal curing, the heating temperature for heating the prepreg increases at a constant speed as time passes. Upon reaching the temperature T1, the heating temperature is held at the temperature T1. The viscosity of the resin in the prepreg keeps decreasing until the heating temperature reaches the temperature T1, starts increasing at the same time as gelling (thermal curing) of the resin starts at around the temperature T1, and eventually completes curing.

Regarding the foaming agent 16 formed of the foaming bodies, a temperature at which the low-temperature side foaming bodies 26a foam is set as a low-temperature side foaming starting temperature T2 (hereinafter referred to simply as temperature T2), and the temperature T2 is lower than the temperature T1 (T2<T1). A temperature at which the high-temperature side foaming bodies 26b foam is set as a high-temperature side foaming starting temperature T3 (hereinafter referred to simply as temperature T3), and the temperature T3 is higher than the temperature T1 (T3>T1). That is, there is a relation among the temperature T1, the temperature T2, and the temperature T3 such that "T2<T1<T3".

Therefore, during the thermal curing, the low-temperature side foaming bodies 26a in the foaming agent 16 foam before the resin in the prepreg reaches the temperature T1, whereby a certain foaming pressure develops inside the internal space of the composite blade. That is, before the resin in the prepreg reaches the temperature T1, the first peak in foaming pressure appears due to foaming of the low-temperature side foaming bodies 26a. Also during the thermal curing, the high-temperature side foaming bodies 26b in the foaming agent 16 foam after the resin in the prepreg reaches the temperature T1, whereby a certain foaming pressure develops in the internal space of the composite blade. The certain foaming pressure is higher than a foaming pressure due to foaming of the low-temperature side foaming bodies 26a. That is, after the resin in the prepreg reaches the temperature T1, the second peak in foaming pressure appears due to foaming of the high-temperature side foaming bodies 26b.

Next, with reference to FIG. 5, states of the foaming agent 16 in terms of foaming thereof are specifically described. A state of the foaming agent 16 before foaming is illustrated in the left part of FIG. 5, a state thereof with the low-temperature side foaming bodies 26a having foamed is illustrated in the center of FIG. 5, and a state thereof with the high-temperature side foaming bodies 26b having foamed is illustrated in the right side of FIG. 5.

Before the curing, the foaming agent 16 before foaming as illustrated in the left part of FIG. 5 is disposed in the internal space 20 formed between the suction-side blade member 12 and the pressure-side blade member 14, and the internal space 20 has a gap 30. When the foaming agent 16 before foaming is heated, the low-temperature side foaming bodies 26a foam first. At the time of this foaming, the resin in the prepreg has not yet reached the temperature T1, and the suction-side blade member 12 and the pressure-side blade member 14 before the curing have not yet cured and contracted. Therefore, the low-temperature side foaming bodies 26a foam, so that the foaming agent 16 pressurizes the suction-side blade member 12 and the pressure-side blade member 14 before the curing from inside to outside with predetermined foaming pressure.

Thereafter, when the foaming agent 16 is further heated, the high-temperature side foaming bodies 26b foam. At the time of this foaming, the resin in the prepreg has already reached the temperature T1, and the suction-side blade member 12 and the pressure-side blade member 14 have cured and contracted. The internal space 20 expands as the suction-side blade member 12 and the pressure-side blade member 14 cures and contracts. Therefore, the high-temperature side foaming bodies 26b foam, so that the foaming agent 16 also pressurizes the suction-side blade member 12 and the pressure-side blade member 14 from inside to outside with predetermined foaming pressure after the internal space 20 expands with the suction-side blade member 12 and the pressure-side blade member 14 having cured and contracted.

In addition, when the low-temperature side foaming bodies 26a and the high-temperature side foaming bodies 26b foam, air bubbles 28 are formed, and the volume of the foaming agent 16 expands by the formed air bubbles 28. In the foaming agent 16, after the volume thereof expands, the foaming agent resin 25 cures together with the suction-side blade member 12 and the pressure-side blade member 14 cure.

Next, the method of shaping the composite blade 10 described above is described with reference to FIG. 6. The method of shaping the composite blade 10 according to the first embodiment includes a laying-up step S1, a mold setting step S2, the curing step S3, and a de-molding step S4.

The laying-up step S1 includes a suction-side laying-up step S1a of forming a suction-side laminate 12a, which is a version of the suction-side blade member 12 before shaping thereof, and a pressure-side laying-up step S1b of forming a pressure-side laminate 14a, which is an unformed version of the pressure-side blade member 14.

In the suction-side laying-up step S1a, the suction-side laminate 12a is formed by laying up plies of the prepreg on the suction-side mold 32 with which to shape the suction-side blade member 12. The suction-side mold 32 has a suction-side forming surface 32a with which to shape the external surface of the suction-side blade member 12 and a flat suction-side mold setting surface 32b provided to the periphery of the suction-side forming surface 32a. The suction-side forming surface 32a is formed so as to dent in a concave shape for the external surface of the suction-side blade member 12 to be formed in a convex curved shape. In the suction-side laying-up step S1a, the suction-side mold 32 is placed with the suction-side forming surface 32a facing vertically upward. The suction-side laminate 12a is then formed by laying up plies of the prepreg on the suction-side forming surface 32a of the suction-side mold 32. In the suction-side laying-up step S1a, vacuuming is carried out each time several plies of the prepreg are laid up, and the suction-side laminate 12a is thus formed.

In the pressure-side laying-up step S1b, the pressure-side laminate 14a is formed by laying up plies of prepreg on the pressure-side mold 34 with which to shape the pressure-side blade member 14. The pressure-side mold 34 has a pressure-side forming surface 34a with which to shape the external surface of the pressure-side blade member 14 and a flat pressure-side mold setting surface 34b provided to the periphery of the pressure-side forming surface 34a. The pressure-side forming surface 34a is formed so as to swell in a convex shape for the external surface of the pressure-side blade member 14 to be formed in a concave curved shape. In the pressure-side laying-up step S1b, the pressure-side mold 34 is placed with the pressure-side forming surface 34a facing vertically upward. The pressure-side laminate 14a is then formed by laying up plies of the prepreg on the pressure-side forming surface 34a of the pressure-side mold 34. In the pressure-side laying-up step S1b, as in the suction-side laying-up step S1a, vacuuming is carried out each time several plies of the prepreg are laid up, and the pressure-side laminate 14a is thus formed.

In the mold setting step S2, mold setting is performed between the suction-side mold 32 and the pressure-side mold 34, and the foaming agent 16 is disposed. Specifically, in the mold setting step S2, the suction-side mold setting surface 32b of the suction-side mold 32 and the pressure-side mold setting surface 34b of the pressure-side mold 34 are overlapped on each other, whereby the suction-side laminate 12a laid up on the suction-side mold 32 and the pressure-side laminate 14a laid up on the pressure-side mold 34 overlap each other with respect to the neutral plane P. The suction-side laminate 12a and the pressure-side laminate 14a thus overlap, forming the hollow internal space 20. In the mold setting step S2 according to the present embodiment, the mold setting is performed between the suction-side mold 32 and the pressure-side mold 34 in the following manner: while the pressure-side mold 34 is placed in the lower side in the same state as it is placed in the pressure-side laying-up step S1b, the suction-side mold 32 is placed on the upper side of the pressure-side mold 34 after being flipped vertically from the state thereof in the suction-side laying-up step S1a.

In the mold setting step S2, the foaming agent 16 before foaming is disposed in the internal space 20 before the suction-side laminate 12a and the pressure-side laminate 14a are overlapped on each other. The foaming agent 16 before foaming is formed in a sheet form. Instead, the foaming agent 16 may be in a paste form. The foaming agent 16 before foaming may be disposed so as to include a part, in the internal space 20, in which a temperature increase is the lowest in the blade-width direction. However, a part in which the foaming agent 16 is disposed is not particularly limited. Examples of the part in which a temperature increase is the lowest include the central part of the internal space 20, a part that is the thickest in the internal space 20 in the blade-thickness direction, and a part corresponding to the thickest parts of the laminates 12a and 14a. In the mold setting step S2 according to the present embodiment, the foaming agent 16 is placed on the laminate formed with the mold that is positioned in the lower side. For example, when the pressure-side mold 34 is positioned on the lower side of the suction-side mold 32, the foaming agent 16 before foaming is placed on the upper surface of the pressure-side laminate 14a.

In the curing step S3, the suction-side laminate 12a, the pressure-side laminate 14a, and the foaming agent 16 are heated while the suction-side mold 32 and the pressure-side mold 34 are pressurized in directions in which these molds 32 and 34 approach each other. In this step, as described above, the foaming agent 16 foam in two stages with the low-temperature side foaming bodies 26a and the high-temperature side foaming bodies 26b foaming in different stages. Therefore, in the curing step S3, the suction-side laminate 12a, the pressure-side laminate 14a, and the foaming agent 16 are heated, whereby the low-temperature side foaming bodies 26a in the foaming agent 16 foam before the resin in the prepreg cures. When the low-temperature side foaming bodies 26a foam, the air bubbles 28 are formed by the low-temperature side foaming bodies 26a, whereby the foaming agent resin 25 before curing expands. Therefore, the pressure inside the internal space 20 is imparted by the expansion of the foaming agent 16, whereby the suction-side laminate 12a and the pressure-side laminate 14a before the curing are pressurized by the foaming agent 16 toward the suction-side mold 32 and the pressure-side mold 34.

Thereafter, when the resin in the prepreg reaches the temperature T1 after the low-temperature side foaming bodies 26a in the foaming agent 16 foam, the foaming agent resin 25 in the foaming agent 16 starts to cure together with the resin in the prepreg. After the resin in the prepreg starts to cure, the high-temperature side foaming bodies 26b in the foaming agent 16 foam. When the high-temperature side foaming bodies 26b foam, the air bubbles 28 are formed by the high-temperature side foaming bodies 26b, whereby the foaming agent resin 25 after the curing is started expands. Therefore, the pressure inside the internal space 20 is imparted by the expansion of the foaming agent 16, whereby the suction-side laminate 12a and the pressure-side laminate 14a after the curing is started are pressurized by the foaming agent 16 toward the suction-side mold 32 and the pressure-side mold 34. As a result of thermal curing of the foaming agent resin 25 in the foaming agent 16 together with the resin in the prepreg, the foaming agent 16 is integrated with the suction-side laminate 12a and the pressure-side laminate 14a, whereby the composite blade 10 is shaped.

In the de-molding step S4, the suction-side mold 32 and the pressure-side mold 34 are moved in directions that draw these molds 32 and 34 apart from each other, whereby the composite blade 10 thus shaped is separated from the suction-side mold 32 and the pressure-side mold 34.

As described above, according to the first embodiment, the foaming agent 16 can foam in two stages in the curing step S3. Therefore, pressurization in the internal space 20 of the composite blade 10 can be maintained, and the foaming agent 16 can appropriately pressurize the internal space 20 of the composite blade 10. Therefore, the composite blade 10 can be prevented from having a shaping defect, so that the composite blade 10 can be suitably shaped.

According to the first embodiment, the high-temperature side foaming bodies 26b foam after the prepreg reaches the temperature T1. Therefore, even when the pressurization is weakened as a result of expansion of the internal space 20 by curing of the prepreg, the insufficiency of pressurization can be avoided because the pressurization in the internal space 20 can be maintained by foaming of the high-temperature side foaming bodies 26b after the temperature T1 is reached.

Furthermore, according to the first embodiment, the low-temperature side foaming bodies 26a foam before the prepreg reaches the temperature T1. Therefore, separation between the plies of prepreg due to decrease in viscosity of the resin in the prepreg when the prepreg is heated can be prevented by foaming of the low-temperature side foaming bodies 26a.

While the foaming agent 16 is caused to foam in two stages in the first embodiment, the foaming agent 16 needs to foam in at least two stages and may be caused to foam in three of more stages.

Second Embodiment

Figure 7:
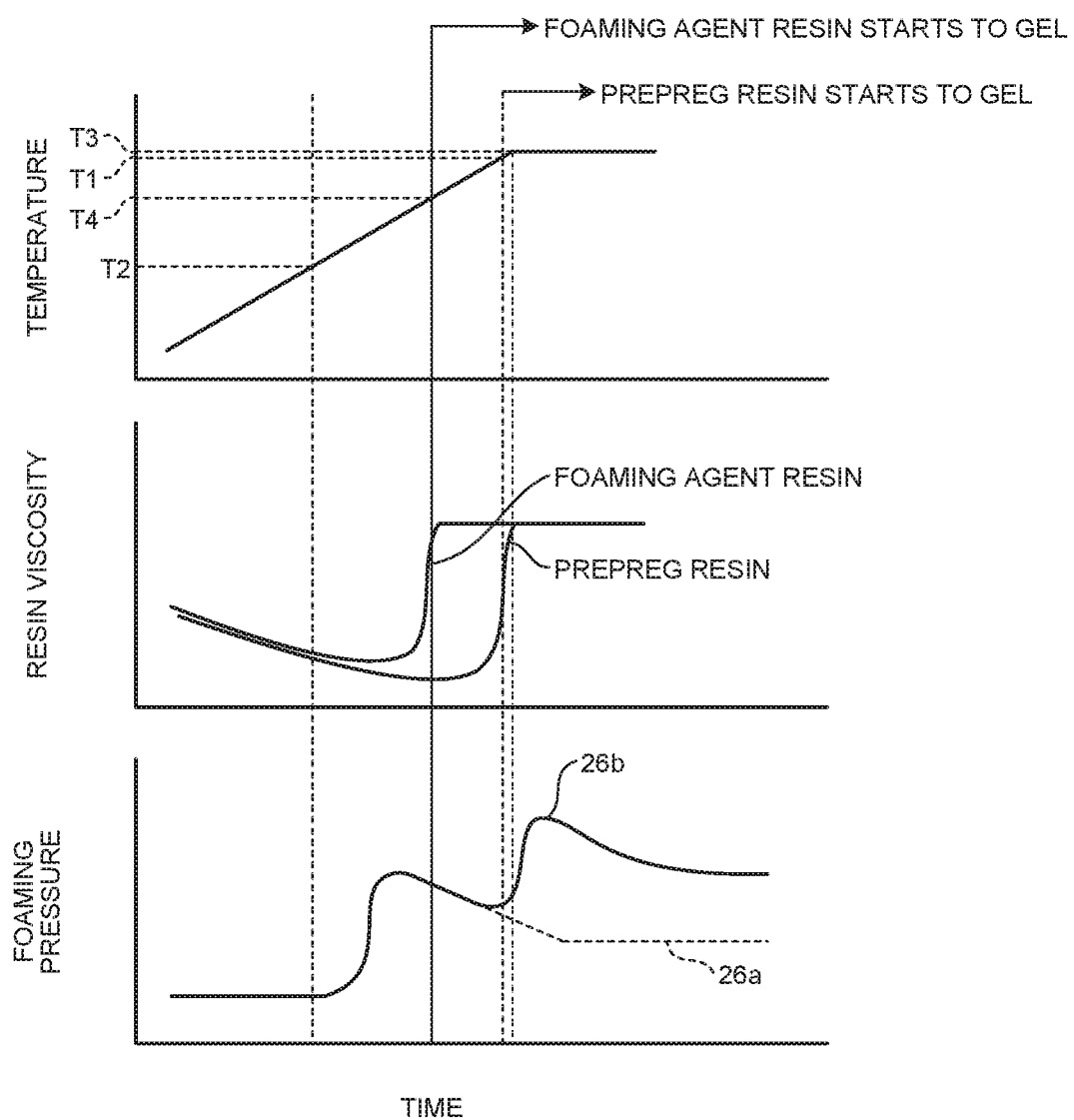
FIG. 7 illustrates graphs regarding a foaming agent for use in a method of shaping a composite blade according to a second embodiment.
Figure 8:
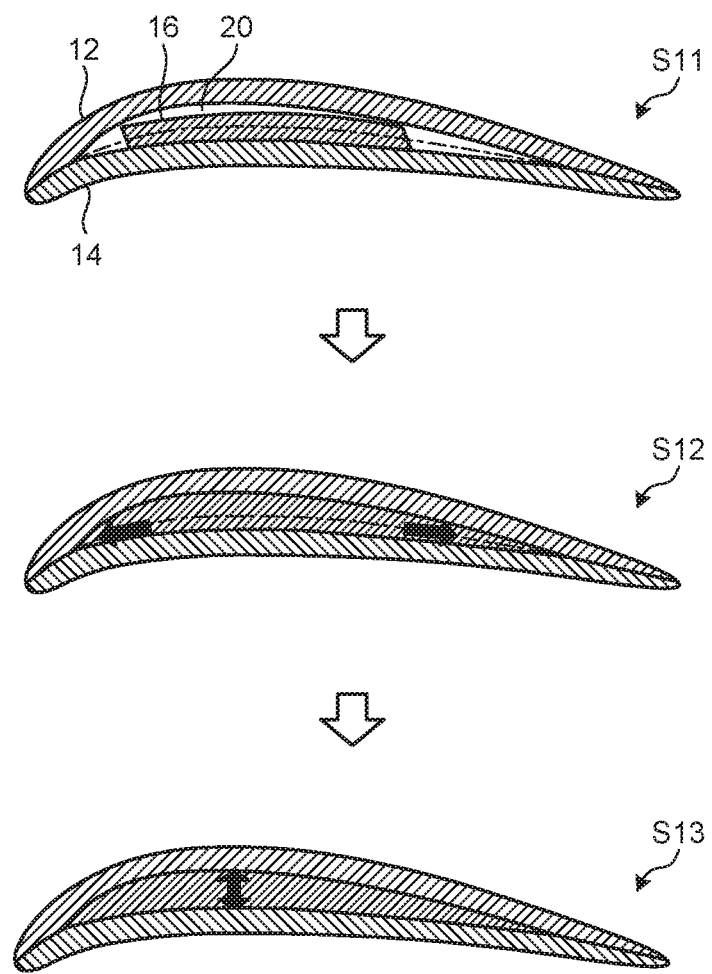
FIG. 8 illustrates states in terms of foaming of the foaming agent for use in the method of shaping a composite blade according to the second embodiment.

Next, a method of shaping the composite blade 10 according to a second embodiment is described with reference to FIG. 7 and FIG. 8. In the second embodiment, for the sake of avoiding redundant description, parts different from the first embodiment are described, and the same components as those in the first embodiment are described with the same reference signs given thereto. FIG. 7 illustrates graphs regarding a foaming agent for use in a method of shaping a composite blade according to the second embodiment. FIG. 8 illustrates states in terms of foaming of the foaming agent for use in the method of shaping a composite blade according to the second embodiment.

In the method of shaping the composite blade 10 according to the first embodiment, the low-temperature side foaming bodies 26a are configured to foam before the temperature T1 is reached. In the method of shaping the composite blade 10 according to the second embodiment, the low-temperature side foaming bodies 26a are configured to foam before a temperature at which the foaming agent resin 25 gels is reached.

As illustrated in FIG. 7, the temperature at which the foaming agent resin 25 contained in the foaming agent 16 gels is set as a foaming agent gelling starting temperature T4 (hereinafter referred to simply as temperature T4). In this embodiment, the temperature T4 is a temperature lower than the temperature T1. Therefore, the foaming agent resin 25 starts to gel before the resin in the prepreg gels.

In the second embodiment, during the thermal curing, the heating temperature for heating the prepreg and the foaming agent 16 increases at a constant speed as time passes. Upon reaching the temperature T1, the heating temperature is held at the temperature T1. The viscosity of the foaming agent resin 25 keeps decreasing until the heating temperature reaches the temperature T4, starts increasing at the same time as gelling (thermal curing) of the resin starts at around the temperature T4, and eventually completes curing. Thereafter, the viscosity of the resin in the prepreg keeps decreasing until the heating temperature reaches the temperature T1, starts increasing at the same time as gelling (thermal curing) of the resin starts at around the temperature T1, and eventually completes curing.

In this embodiment, the temperature T2 at which the low-temperature side foaming bodies 26a foam is lower than the temperature T4 (T4<T1). In addition, the temperature T3 at which the high-temperature side foaming bodies 26b foam is higher than the temperature T1 (T3>T1) as in the first embodiment. That is, the relation among the temperature T1, the temperature T2, the temperature T3, and the temperature T4 is "T2<T4<T1<T3".

Therefore, as illustrated in FIG. 8, the foaming agent 16 starts being heated after being disposed in the internal space 20 of the composite blade 10 (step S11) in the thermal curing (curing step S3). Consequently, the low-temperature side foaming bodies 26a in the foaming agent 16 foam before the foaming agent resin 25 reaches the temperature T4, whereby a certain foaming pressure develops inside the internal space 20 of the composite blade 10. That is, before the foaming agent resin 25 reaches the temperature T4, the first peak in foaming pressure appears due to foaming of the low-temperature side foaming bodies 26a. In this case, the viscosity of the foaming agent resin 25 is low. Therefore, the internal space 20 is filled with the foaming agent resin 25 by foaming of the low-temperature side foaming bodies 26a (step S12). Thereafter, the foaming agent resin 25 starts to gel when the foaming agent resin 25 reaches the temperature T4, and the prepreg starts to gel when the resin in the prepreg reaches the temperature T1. As in the first embodiment, during the thermal curing, the high-temperature side foaming bodies 26b in the foaming agent 16 foam after the resin in the prepreg reaches the temperature T1, whereby a certain foaming pressure develops inside the internal space 20 of the composite blade 10 (step S13). The certain foaming pressure is higher than a foaming pressure due to foaming of the low-temperature side foaming bodies 26a. That is, after the resin in the prepreg reaches the temperature T1, the second peak in foaming pressure appears due to foaming of the high-temperature side foaming bodies 26b.

As described above, according to the second embodiment, the prepreg gelling starting temperature T1 is higher than the foaming agent gelling starting temperature T4, so that the foaming agent resin 25 in the foaming agent 16 cures earlier than the resin in the prepreg. Consequently, the low-temperature side foaming bodies 26a foam before the foaming agent resin 25 reaches the temperature T4, whereby the internal space 20 of the composite blade 10 can be filled with the foaming agent 16 by dispersion before the foaming agent 16 cures.

REFERENCE SIGN LIST

10 Composite blade
10a Thin part
10b Thick part
12 Suction-side blade member
12a Suction-side laminate
14 Pressure-side blade member
14a Pressure-side laminate
16 Foaming agent
25 Foaming agent resin
26 Foaming body
26a Low-temperature side foam
26b High-temperature side foam
28 Air bubble
32 Suction-side mold
34 Pressure-side mold

The invention claimed is:

1. A method of shaping a composite blade made of a composite material by curing prepreg in which reinforcing fibers are impregnated with resin, the composite blade including a suction-side part and a pressure-side part which are overlapped and bonded to each other, the method comprising:

laying up plies of the prepreg in a suction-side mold for shaping the suction-side part to form a suction-side laminate and laying up plies of the prepreg in a pressure-side mold for shaping the pressure-side part to form a suction-side laminate;

performing mold setting between the suction-side mold and the pressure-side mold so that the suction-side laminate and the pressure-side laminate overlap each other, and disposing a foaming agent in an internal space formed by having the suction-side laminate and the pressure-side laminate overlapped on each other; and pressurizing the suction-side laminate and the pressure-side laminate from inside toward the suction-side mold and the pressure-side mold, respectively, by heating the foaming agent to expand, and heating the suction-side laminate and the pressure-side laminate to cure, wherein the foaming agent includes a plurality of foaming bodies adapted to foam by being heated and foaming agent resin adapted to cure by being heated, and the plurality of foaming bodies include low-temperature side foaming bodies adapted to foam in a low temperature range in the heating the suction-side laminate and the pressure-side laminate to cure, and high-temperature side foaming bodies adapted to foam in a high temperature range corresponding to temperatures higher than the low temperature range in the heating the suction-side laminate and the pressure-side laminate to cure.

2. The method according to claim 1, wherein a temperature at which the high-temperature side foaming bodies starts to foam is higher than a temperature at which the resin in the prepreg starts to gel.

3. The method according to claim 1, wherein a temperature at which the low-temperature side foaming bodies starts to foam is lower than a temperature at which the resin in the prepreg starts to gel.

4. The method according to claim 3, wherein
the temperature at which the resin in the prepreg starts to gel is higher than a temperature at which the foaming agent resin in the foaming agent starts to gel, and
the temperature at which the low-temperature side foaming bodies starts to foam is lower than the temperature at which the foaming agent resin in the foaming agent starts to gel.

* * * * *